United States Patent
Nakagawa et al.

(10) Patent No.: US 11,855,760 B2
(45) Date of Patent: Dec. 26, 2023

(54) TRANSMISSION DEVICE, TIME TRANSMISSION SYSTEM, AND DELAY COMPENSATION METHOD

(71) Applicant: Nippon Telegraph and Telephone Corporation, Tokyo (JP)

(72) Inventors: Masahiro Nakagawa, Musashino (JP); Kaoru Arai, Musashino (JP); Hiroki Sakuma, Musashino (JP); Shunichi Tsuboi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 148 days.

(21) Appl. No.: 17/428,240

(22) PCT Filed: Feb. 6, 2020

(86) PCT No.: PCT/JP2020/004617
§ 371 (c)(1),
(2) Date: Aug. 3, 2021

(87) PCT Pub. No.: WO2020/166484
PCT Pub. Date: Aug. 20, 2020

(65) Prior Publication Data
US 2022/0294549 A1 Sep. 15, 2022

(30) Foreign Application Priority Data
Feb. 14, 2019 (JP) .................. 2019-024801

(51) Int. Cl.
*H04J 3/06* (2006.01)
*H04L 7/00* (2006.01)

(52) U.S. Cl.
CPC .......... *H04J 3/0667* (2013.01); *H04J 3/0682* (2013.01); *H04L 7/0033* (2013.01)

(58) Field of Classification Search
CPC ...... H04J 3/0667; H04J 3/0682; H04L 7/0033
See application file for complete search history.

(56) References Cited

U.S. PATENT DOCUMENTS

| 2009/0122813 A1* | 5/2009 | Zhang | H04J 3/065 370/503 |
| 2011/0262133 A1* | 10/2011 | Yuan | H04J 3/0667 398/43 |

(Continued)

FOREIGN PATENT DOCUMENTS

CN 105933085 6/2018

OTHER PUBLICATIONS

IEEE Instrumentation and Measurement Society, "IEEE Standard for a Precision Clock Synchronization Protocol for Networked Measurement and Control Systems," IEEE Std 2008, dated Jul. 24, 2008, 290 pages.

*Primary Examiner* — Brenda H Pham
(74) *Attorney, Agent, or Firm* — Fish & Richardson P.C.

(57) ABSTRACT

The accuracy of an offset value is improved by correcting an error in time synchronization caused by link asymmetry. PTP packets are exchanged between a master node 3 and a slave node 4 vis a first transmission device 1 connected to the master node 3 and a second transmission device 2 corresponding to the first transmission device 1 and connected to the slave node 4. The second transmission device 2 includes: a transmission section 16 configured to transmit PTP packets for a plurality of wavelengths to the corresponding transmission device simultaneously; and a reception section 17 configured to calculate a propagation delay Dms on a path from the corresponding transmission device to the second transmission device 2 based on a difference between the arrival times of the PTP packets for the plurality of wavelengths received from the corresponding transmission device, and provide the propagation delay Dms to the (Continued)

slave node 4 as a correction parameter used in a process of synchronizing the time of the slave node 4.

3 Claims, 17 Drawing Sheets

(56) References Cited

U.S. PATENT DOCUMENTS

| | | | | |
|---|---|---|---|---|
| 2013/0094523 | A1* | 4/2013 | Shen | H04J 3/0658 370/503 |
| 2013/0121352 | A1* | 5/2013 | Shen | H04J 14/0201 370/503 |
| 2015/0104167 | A1* | 4/2015 | Bottari | H04B 10/2513 398/16 |
| 2017/0164387 | A1* | 6/2017 | Lou | H04W 74/04 |

* cited by examiner

TRANSMISSION DEVICE, TIME TRANSMISSION SYSTEM, AND DELAY COMPENSATION METHOD

CROSS-REFERENCE TO RELATED APPLICATIONS

This application is a National Stage application under 35 U.S.C. § 371 of International Application No. PCT/JP2020/004617, having an International Filing Date of Feb. 6, 2020, which claims priority to Japanese Application Serial No. 2019-024801, filed on Feb. 14, 2019. The disclosure of the prior application is considered part of the disclosure of this application, and is incorporated in its entirety into this application.

TECHNICAL FIELD

The present invention relates to a transmission device, a time transmission system and a delay correction method.

BACKGROUND ART

Time synchronization technologies are needed for coordination among mobile base stations, for example, in the next generation (the fifth generation (5G)) mobile communication. For example, a time synchronization system is realized by distributing time reference devices, Grand Masters (GMs), at multiple sites. A GM at each site functions as a Global Navigation Satellite System (GNSS) receiver that can receive signals directly from GNSS satellites, and delivers the received signals directly to end applications.

An increase in the number of high-performance GNSS receivers, however, leads to higher costs. In addition, when those GMs cannot receive signals from satellites because of bad weather, the time accuracy decreases.

Thus, for example, Precision Time Protocol (PTP), in which time synchronization is performed using the timestamps of packets, is used to deliver information from GMs over packet networks (i.e., GNSS signals are indirectly received) (see Non-Patent Literature 1). In PTP, time synchronization is performed through highly reliable networks provided by telecommunications carriers.

This enables a decrease in the number of GNSS antennas and the receiving sites thereof and an improvement in reliability of GNSS reception by providing the decreased number of GNSS receivers (GMs) with a monitoring function. Duplication of paths in packet networks can also increase reliability of GNSS reception. Moreover, a GM can multiplex a PTP packet with a primary signal, thereby transmitting time information in an economical and accurate manner.

FIG. 18 is a block diagram illustrating a time transmission system to which a time synchronization technique is applied.

The time transmission system includes a GM node $82z$, which is a PTP node compatible with PTP, Boundary Clock (BC) nodes $83z$ and $84z$, an Ordinary Clock (OC) node $85z$, all of which are connected by a network.

In the following, when time synchronization is performed between the PTP nodes, the PTP node that transmits time information is referred to as a master node $91z$ (see FIG. 19) and the PTP node that is being synchronized and receives the time information from the master node $91z$ is referred to as a slave node $92z$ (see FIG. 19). The flow of transmission of the time information is illustrated by the bold arrows in FIG. 18. The origin of each arrow is on the uplink side and the tip of the arrow is on the downlink side. That is, accurate time information is transmitted from the uplink side to the downlink side on the following path: the GM node $82z \rightarrow$ the BC node $83z \rightarrow$ the BC node $84z \rightarrow$ the OC node $85z$.

The GM node $82z$ includes an antenna $82a$ for receiving signals directly from a GPS satellite $81z$.

The BC node $83z$ functions as a slave node $92z$ that receives time information from its master node $91z$, i.e., the GM node $82z$, and then as a master node $91z$ for the BC node $84z$ and transmits the time information to the BC node $84z$.

The BC node $84z$ functions as a slave node $92z$ that receives time information from the BC node $83z$, and then as a master node $91z$ for the OC node $85z$ and transmits the time information to the OC node $85z$.

The OC node $85z$ functions as a slave node $92z$ that receives time information from the BC node $84z$, and then transmits the time information to an end terminal $86z$.

The reason why the BC nodes $83z$, $84z$ and the OC node $85z$ are called differently is that the BC nodes $83z$ and $84z$ have multiple connection ports to other PTP nodes and the OC node $85z$ has only one connection port.

FIG. 19 is a sequence diagram illustrating how PTP works.

PTP packets with time information (timestamps) are exchanged between a master node $91z$ and a slave node $92z$. As PTP packets, a downlink Sync message (S11$z$), a downlink Follow-up message (S12$z$), an uplink Delay_Request message (S13$z$) and a downlink Delay_Response message (S14$z$) are exchanged in this order.

The transmit time t1 is the time at which the master node $91z$ transmits the Sync message (S11$z$). Because it is difficult to include the transmit time t1 of the Sync message in the Sync message itself, the subsequent Follow-up message notifies the slave node $92z$ of the transmit time t1 of the Sync message.

The receive time t2 is the time at which the Sync message arrives at the slave node $92z$.

The transmit time t3 is the time at which the slave node $92z$ transmits the Delay_Request message.

The receive time t4 is the time at which the Delay_Request message arrives at the master node $91z$. The receive time t4 is indicated to the slave node $92z$ by including the receive time t4 in the Delay_Response message in response to the Delay_Request message.

In this way, the slave node $92z$ knows all the four timestamps (the transmit times t1 and t2 and the receive times t3 and t4).

In transmitting and receiving PTP packets, the following propagation delays may occur:

A downlink delay Dms: a propagation delay of the Sync message in the downlink direction from the master node $91z$ to the slave node $92z$. The Dms can be calculated by using the time difference between the clock of the master node $91z$ and the clock of the slave node $92z$ as an offset value as follows: the downlink delay Dms=(the receive time t2–the offset value)–the transmit time t1.

An uplink delay Dsm: a propagation delay of the Delay_Request message in the uplink direction from the slave node $92z$ to the master node $91z$. The uplink delay Dsm can be calculated as follows: the uplink delay Dsm=the receive time t4–(the transmit time t3–the offset value).

Assuming that the downlink delay Dms=the uplink delay Dsm, the slave node 92z can calculate the offset value by the following expression 1:

The offset value=((the receive time $t2$–the transmit time $t1$)–(the receive time $t4$–the transmit time $t3$))/2     (Expression 1)

The slave node 92z corrects its clock time using the calculated offset value so that the clock of the master node 91z and the clock of the slave node 92z are synchronized (set to indicate the same time).

CITATION LIST

Non-Patent Literature

Non-Patent Literature 1: IEEE (The Institute of Electrical and Electronics Engineers, Inc.), "IEEE Standard for a Precision Clock Synchronization Protocol for Networked Measurement and Control Systems", IEEE Std 1588-2008, Revision of IEEE Std 1588-2002, Jul. 24, 2008

SUMMARY OF THE INVENTION

Technical Problem

PTP is a protocol designed on the assumption that the uplink delay is equal to the downlink delay on a transmission path of PTP packets. Accordingly, an error in time synchronization accuracy occurs if there is a link asymmetry (difference between the uplink delay and the downlink delay). The following shows some causes of link asymmetry.
(a) Delays in devices on a transmission path may vary, for example, due to buffering for packet processing or due to frame processing.
(b) Delays of transmission lines may vary, for example, due to the difference between the lengths of fiber-optic cables when duplex fiber-optic bidirectional communication is performed—an optical path length difference of 1 m results in a delay of 5 ns (5 ns/m)—, or due to changes in the transmission line caused by temperature changes. The time error between geographically distant sites becomes greater in proportion to the optical path length difference in in-station wiring.

If there is such a link asymmetry, the accuracy of the offset value calculated using (Expression 1) degrades.

In consideration of the above, the main object of the present invention is to improve the accuracy of the offset value by correcting an error in time synchronization caused by link asymmetry.

Means for Solving the Problem

To solve the problem described above, a transmission device according to the present invention has the following features.

The present invention provides a transmission device for use in a time transmission system, the time transmission system synchronizing time of a second time synchronization device based on time information of transmission and reception of packets for time synchronization between a first time synchronization device and the second time synchronization device via a first transmission device connected to the first time synchronization device and a second transmission device corresponding to the first transmission device and connected to the second time synchronization device, the transmission device being operable as the first transmission device or the second transmission device, comprising:
a transmission section configured to transmit the packets for time synchronization for a plurality of wavelengths to a corresponding transmission device simultaneously; and
a reception section configured to receive the packets for time synchronization for the plurality of wavelengths from the corresponding transmission device, wherein
the reception section is further configured to measure a propagation delay on a path from the corresponding transmission device to the transmission device based on a difference between arrival times of the received packets for time synchronization for the plurality of wavelengths, and provide the propagation delay to the second time synchronization device as a correction parameter used in a process of synchronizing time of the second time synchronization device.

This enables time synchronization with high accuracy by correcting its error using the transmit times and the receive times of packets for time synchronization even if the transmit times and the receive times are influenced by link asymmetry between the time synchronization devices. A propagation delay measured with high accuracy between the first transmission device and the second transmission device is used as a parameter for the correction.

The present invention provides a time transmission system comprising the transmission device, the first time synchronization device and the second time synchronization device, wherein
the second time synchronization device is configured to calculate an offset value that is a difference between a clock of the first time synchronization device and a clock of the second time synchronization device by using transmit times and receive times of the packets for time synchronization at the time synchronization devices and correction parameters provided by the first transmission device and the second transmission device.

This can cancel link asymmetry using the correction parameters and enable time synchronization with high accuracy based on the accurate offset value.

Effects of the Invention

According to the present invention, the accuracy of an offset value can be improved by correcting an error in time synchronization caused by link asymmetry.

DESCRIPTION OF EMBODIMENTS

An embodiment of the present invention will be described below in detail with reference to the drawings.

Figure 1:
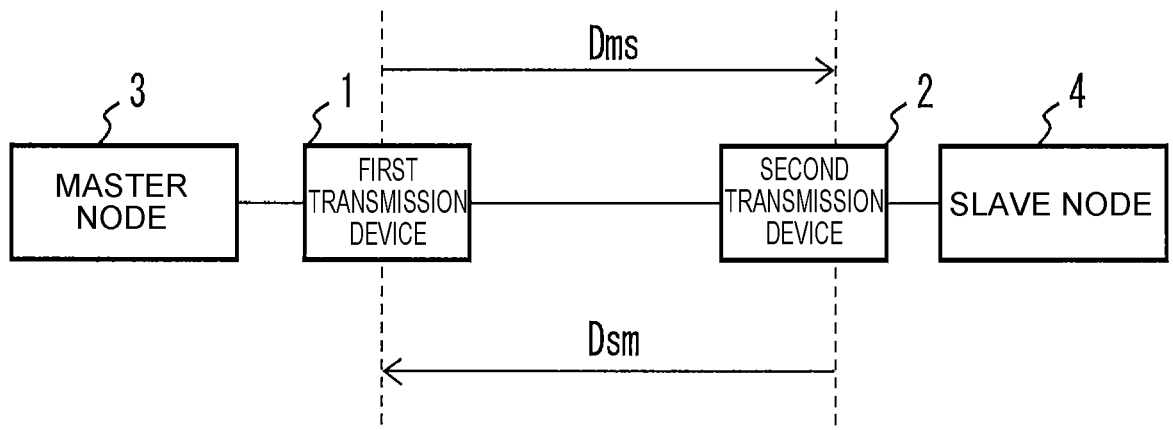
FIG. 1 is a block diagram illustrating a time transmission system to which a time synchronization technique is applied according to an embodiment of the invention.

FIG. 1 is a block diagram illustrating a time transmission system to which a time synchronization technique is applied.

In the time transmission system according to the embodiment, a time synchronization process for a slave node (second time synchronization device) 4 is performed by exchanging PTP packets (packets for time synchronization) between a master node (first time synchronization device) 3 and the slave node 4, which function as time synchronization devices.

As transmission devices that relay the PTP packets, a first transmission device 1 and a second transmission device 2 are provided with those transmission devices corresponding to each other. The master node 3 and the first transmission device 1 are directly connected and paired and the slave node 4 and the second transmission device 2 are directly connected and paired. Those transmission devices have a function of measuring a link asymmetry between the master node 3 and the slave node 4 (see FIG. 9 for details) as well as the packet relay function.

Figure 19:
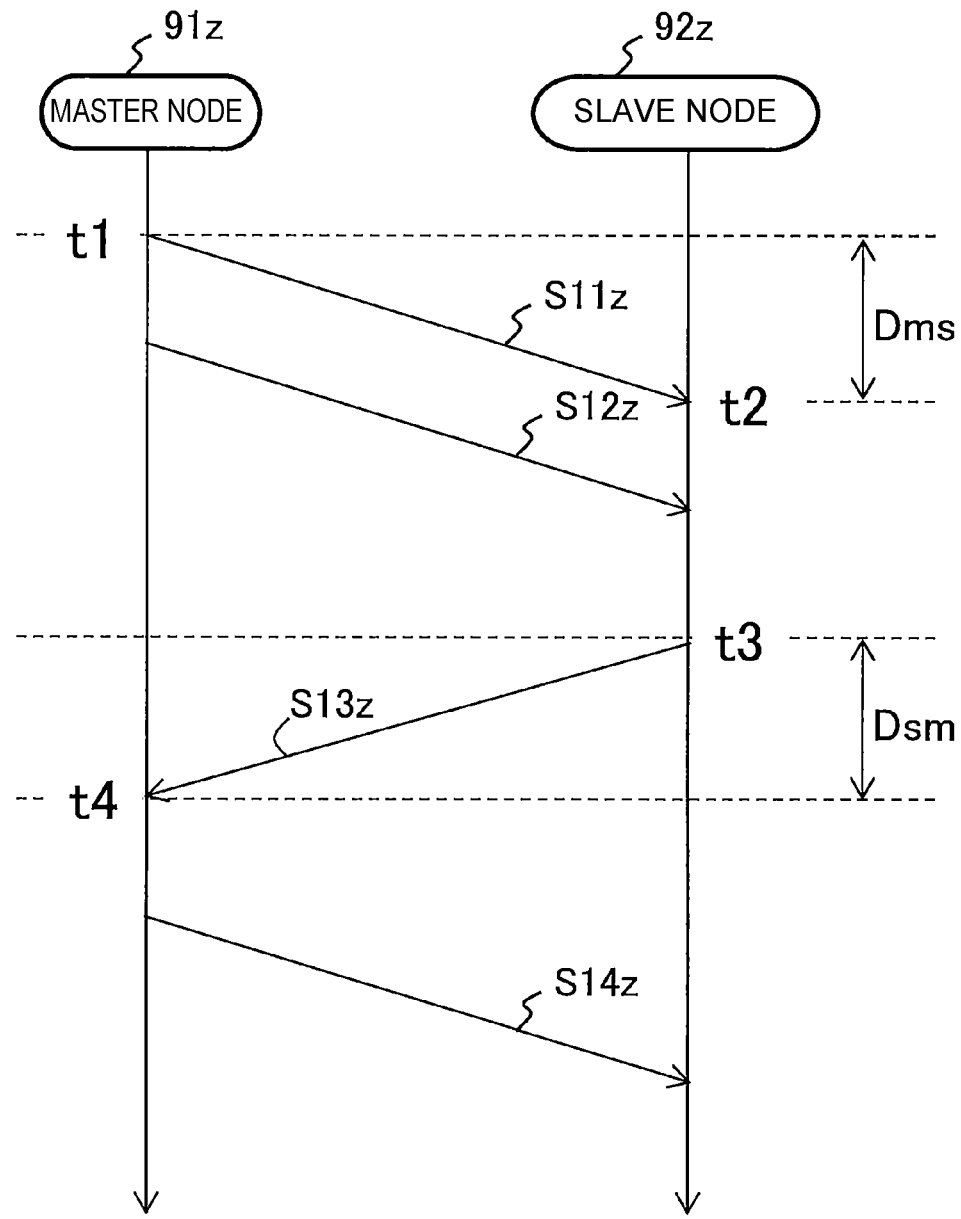
FIG. 19 is a sequence diagram illustrating how PTP works.

The time transmission system transmits downlink Sync message (S11z in FIG. 19) on the following path: the master node 3→the first transmission device 1→the second transmission device 2→the slave node 4, and transmits an uplink Delay_Request message (S13z in FIG. 19) on the inverse path.

A propagation delay occurring on the uni-directional path from the first transmission device 1 to the second transmission device 2, which is the main component of a propagation delay on the path from the master node 3 to the slave node 4, is hereinafter referred to as a "Dms" (first propagation delay).

A propagation delay occurring on the uni-directional path from the second transmission device 2 to the first transmission device 1, which is the main component of a propagation delay on the path from the slave node 4 to the master node 3, is hereinafter referred to as a "Dsm" (second propagation delay).

"ms" of the propagation delay Dms indicates the direction from master to slave and "sm" of the propagation delay Dsm indicates the direction from slave to master. If |the propagation delay Dms−the propagation delay Dsm|>0, there is a link asymmetry between the time synchronization devices and the link asymmetry can be attributed to the sum of the delays in the devices (the first transmission device 1 and the second transmission device 2) on the transmission paths and the delays of the transmission lines.

The link asymmetry between the transmission devices can be nearly equal to the link asymmetry between the time synchronization devices by configuring the time transmission system as follows:

The lengths of the uplink wiring and the downlink wiring between the master node 3 and the first transmission device 1 are the same, and the lengths of the uplink wiring and the downlink wiring between the second transmission device 2 and the slave node 4 are the same. It is desirable to locate the devices near each other, for example, by accommodating the wiring between the devices in the same building.

A first synchronization module 10 is incorporated in the master node 3 and a second synchronization module 20 is incorporated in the slave node 4.

Figure 2:
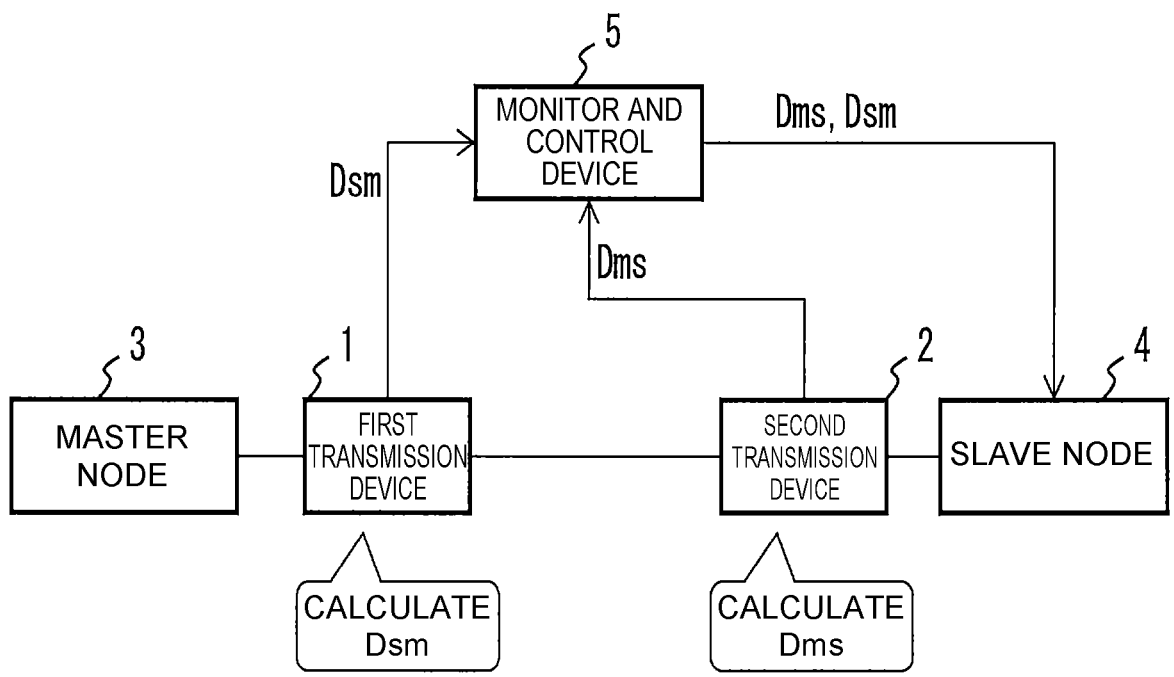
FIG. 2 is a block diagram of the time transmission system shown in FIG. 1 in a case where an error in time synchronization caused by link asymmetry is corrected according to the embodiment of the invention.

FIG. 2 is a block diagram of the time transmission system shown in FIG. 1 in a case where an error in time synchronization caused by link asymmetry is corrected.

The second transmission device 2 calculates a propagation delay Dms that occurs while a downlink PTP packet is delivered from the master node 3 to the second transmission device 2, and provides the calculated propagation delay Dms to a monitor and control device 5.

Similarly, the first transmission device 1 calculates a propagation delay Dsm that occurs while an uplink PTP packet is delivered from the slave node 4 to the first transmission device 1, and provides the calculated propagation delay Dsm to the monitor and control device 5.

The monitor and control device 5 transmits the provided propagation delays Dms and Dsm (delay amounts) to the slave node 4, which in turn uses the propagation delays Dms and Dsm as correction parameters to calculate an offset.

Accordingly, even when the uplink delay is not equal to the downlink delay, i.e., there is a link asymmetry, the accuracy of the calculated offset can be improved by taking into account the link asymmetry in calculating the offset.

For example, even if PTP packets are transmitted on the same path in the same direction, the delay amounts for the PTP packets are variable due to network congestion at the time of transmission of the PTP packets. It is possible, however, to prevent the accuracy of the calculated offset from fluctuating depending on the degree of the link asymmetry by using the variation of delay as a correction parameter to calculate the offset, thereby enabling time synchronization with high accuracy between geographically distant sites.

Figure 3:
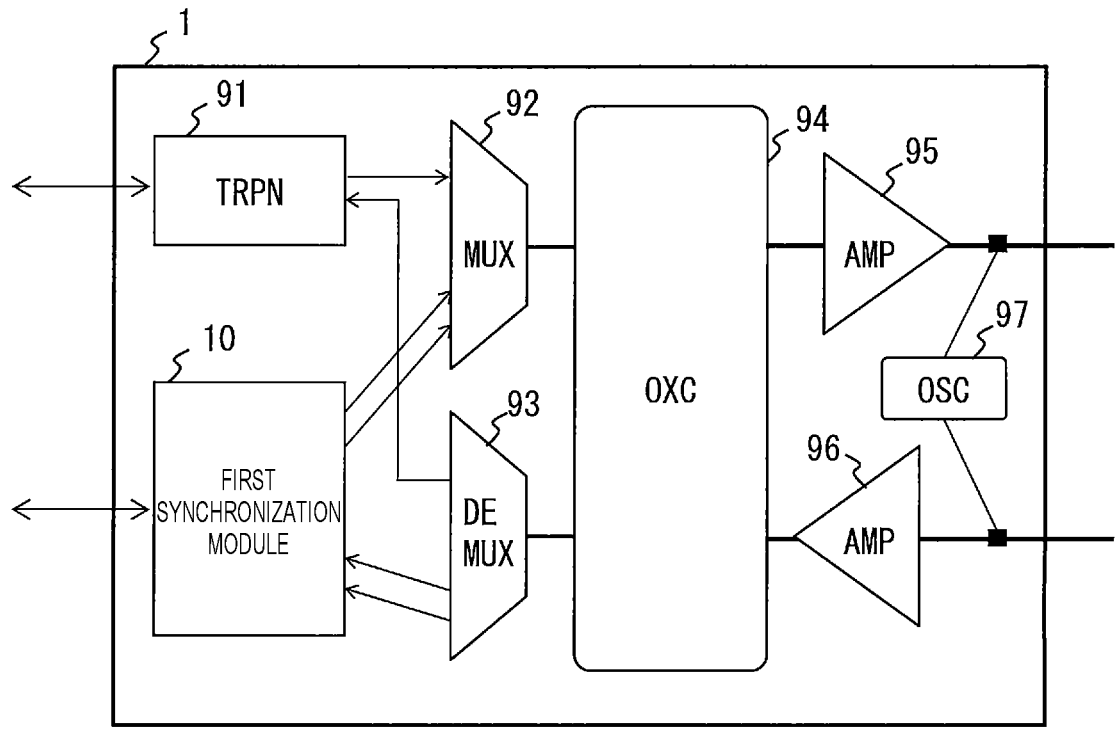
FIG. 3 is a block diagram illustrating a first transmission device according to the embodiment of the invention.

FIG. 3 is a block diagram illustrating the first transmission device 1. The first transmission device 1 is configured as a device to which the Wavelength Division Multiplexing (WDM) technology is applied for relaying optical signals. The first transmission device 1 includes, as its basic packet transmission units, a Transponder (TRPN) 91, a multiplexer (MUX) 92, a demultiplexer (DEMUX) 93, an Optical Cross Connect (OXC) 94, Amplifiers (AMP) 95 and 96 and an Optical Supervisory Channel (OSC) 97.

Usually, these basic packet transmission units do not need to be replaced once they are installed in the first transmission device 1. Replacement or enhancement is exceptionally required when the telecommunications demand surges or these packet transmission units fail.

The first transmission device 1 also includes a first synchronization module 10 as a processing unit that measures propagation delays Dms and Dsm using PTP packets. The first synchronization module 10 is connected to a master node 3 and exchanges PTP packets with the master node 3. That is, the first synchronization module 10 can be added to the first transmission device 1 as an independent unit without changing the basic packet transmission units. This enables the function for measuring a link asymmetry as shown in FIG. 2 to be added at low cost.

The TRPN 91 is connected to a conventional router or transfer device other than the master node 3 and exchanges packets with the router or transfer device.

The optical signals transmitted by the first synchronization module 10 and the TRPN 91 are output to an optical network via the MUX 92, OXC 94, AMP 95 and OSC 97. The OSC 97 monitors the transmission lines and controls the device.

The optical signals received from the optical network are transferred to the first synchronization module 10 and the TRPN 91 via the OSC 97, AMP 96, OXC 94, MUX 92 and DEMUX 93.

Figure 4:
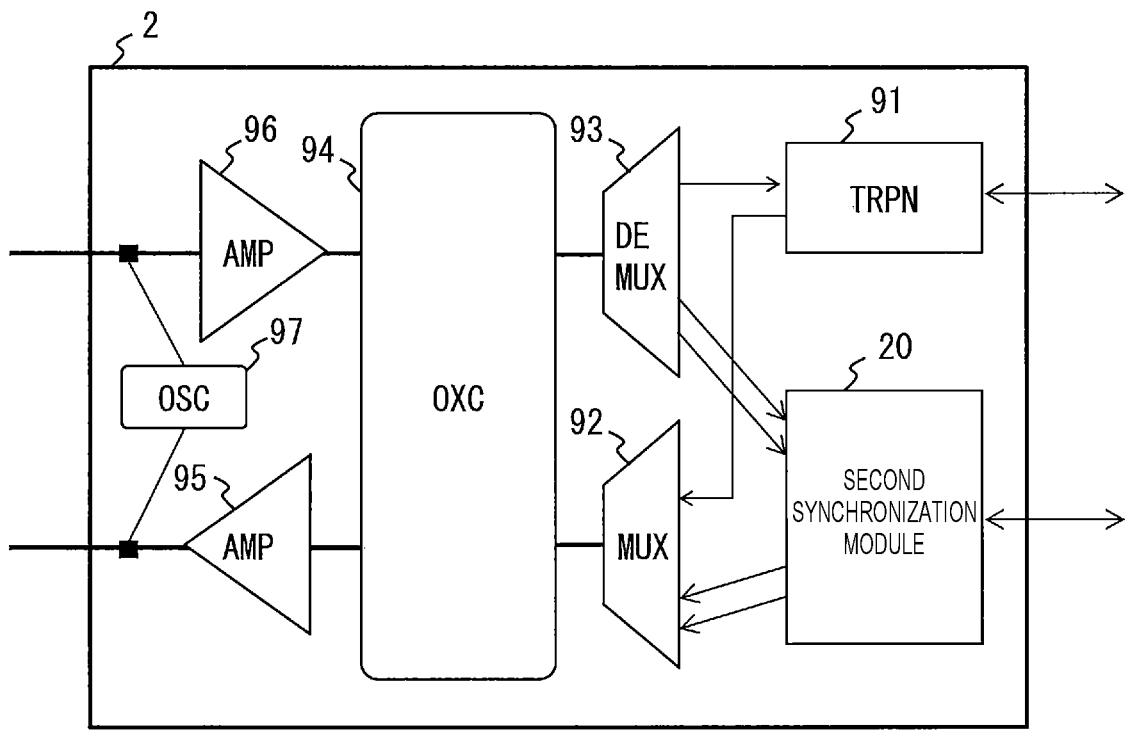
FIG. 4 is a block diagram illustrating a second transmission device according to the embodiment of the invention.

FIG. 4 is a block diagram illustrating the second transmission device 2. As in the first transmission device 1, the second transmission device 2 includes, as its basic packet transmission units, a TRPN 91, a MUX 92, a DEMUX 93, an OXC 94, AMPS 95 and 96 and an OSC 97. The functions of the basic packet transmission units of the second transmission device 2 are the same as those of the first transmission device 1 and therefore are not described again with reference to FIG. 4.

The second transmission device 2 also includes a second synchronization module 20 as a processing unit that measures propagation delays Dms and Dsm using PTP packets. The second synchronization module 20 is connected to a slave node 4 and exchanges PTP packets with the slave node 4.

Figure 5:
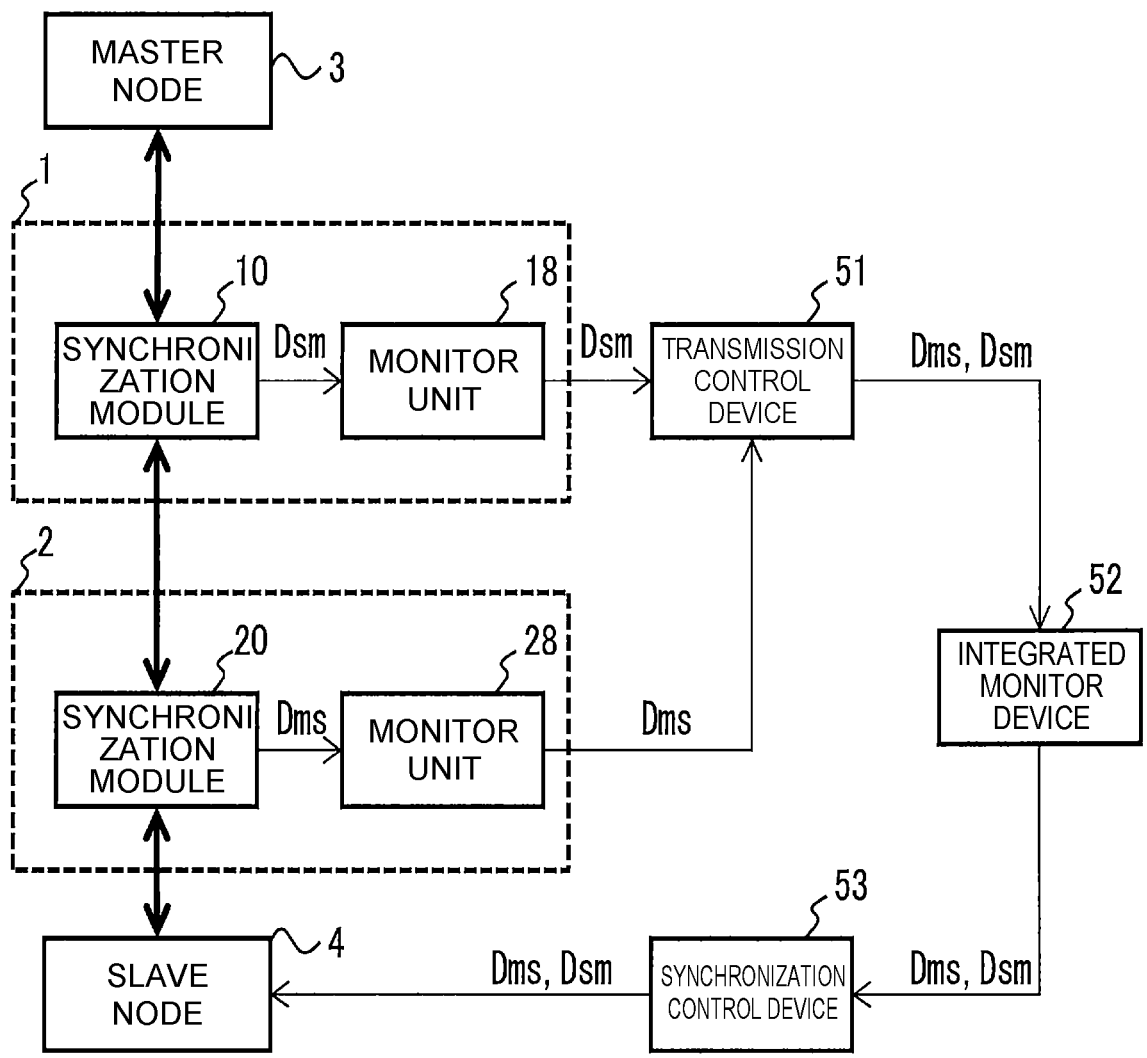
FIG. 5 is a block diagram illustrating paths to transfer propagation delays calculated at both synchronization modules to a slave node according to the embodiment of the invention.

FIG. 5 is a block diagram illustrating paths to transfer the propagation delays calculated at both synchronization modules to the slave node 4.

In FIG. 2, propagation delays Dms and Dsm are relayed by the monitor and control device 5 to the slave node 4. In FIG. 5, however, the function of the monitor and control device 5 is divided and distributed on a transmission control device 51, an integrated monitor device 52 and a synchronization control device 53.

The transmission control device 51 manages the transmission devices (the first transmission device 1 and the second transmission device 2). The synchronization control device 53 manages the time synchronization devices (the master node 3 and the slave node 4).

The first transmission device 1 includes a monitor unit 18 that provides a propagation delay Dsm measured at the first transmission device 1 to the transmission control device 51 that covers the first transmission device 1. The second transmission device 2 includes a monitor unit 28 that provides a propagation delay Dms measured at the second transmission device 2 to the transmission control device 51 that covers the second transmission device 2.

The integrated monitor device 52 maintains propagation delays Dms and Dsm provided by the transmission control device 51 and provides the propagation delays Dms and Dsm to the slave node 4 that is covered by the synchronization control device 53.

In this manner, the slave node 4 can obtain propagation delays Dms and Dsm as correction parameters. It is desirable for reducing correction time that the transmission control device 51 and the transmission devices are integrated into one device or located near each other, for example, in the same building and that the synchronization control device 53 and the time synchronization device are integrated into one device or located near each other, for example, in the same building.

Figure 6:
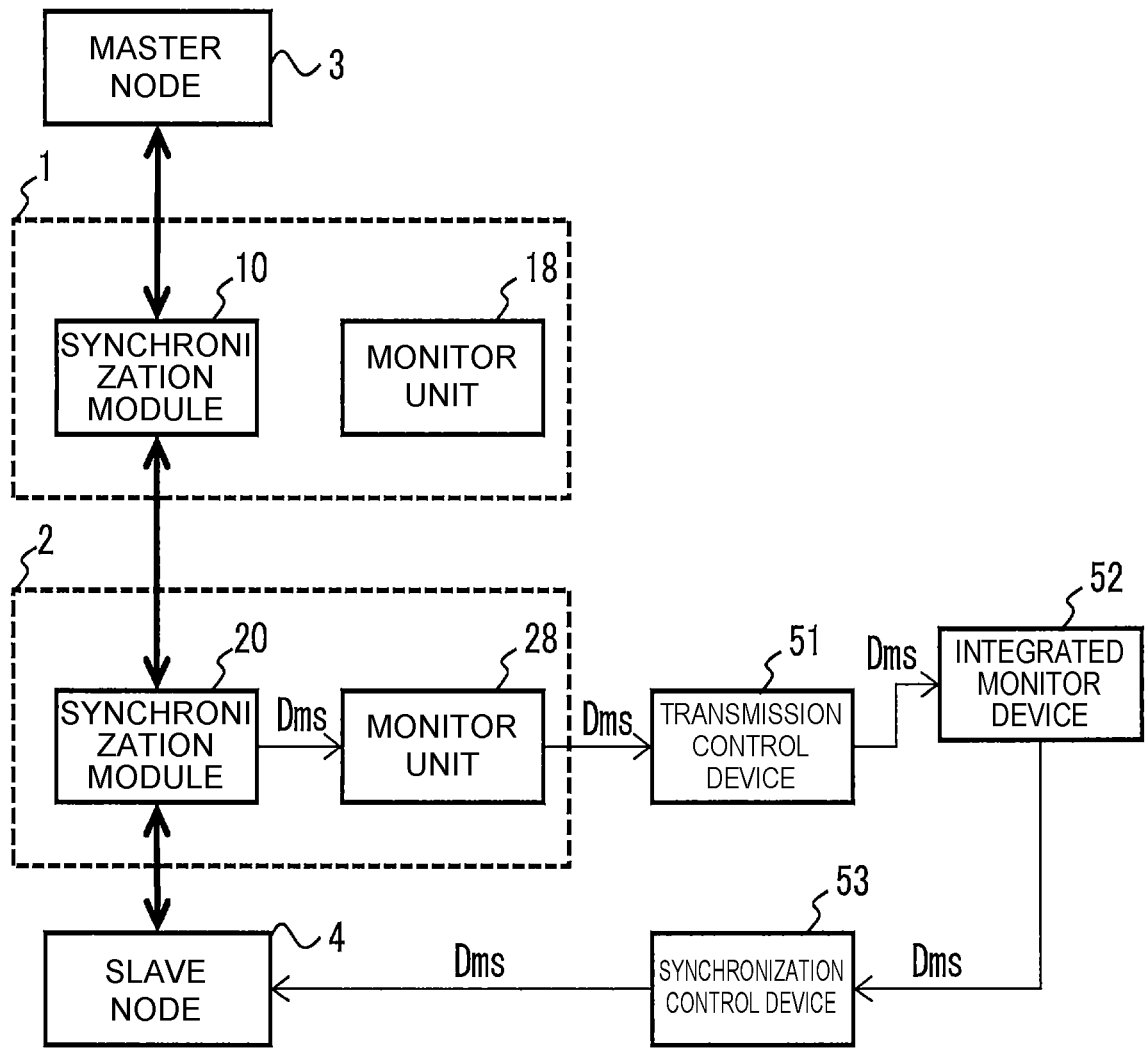
FIG. 6 is a block diagram illustrating a path to transfer a propagation delay calculated at one synchronization module to the slave node according to the embodiment of the invention.

FIG. 6 is a block diagram illustrating a path to transfer a propagation delay Dms calculated at the synchronization module (in the second transmission device 2) to the slave node 4. The configuration shown in FIG. 5 can be simplified so that only a propagation delay Dms calculated at the second transmission device 2 is provided to the slave node 4 when only the propagation delay Dms needs to be calculated as a correction parameter as shown in FIG. 6.

Figure 7:
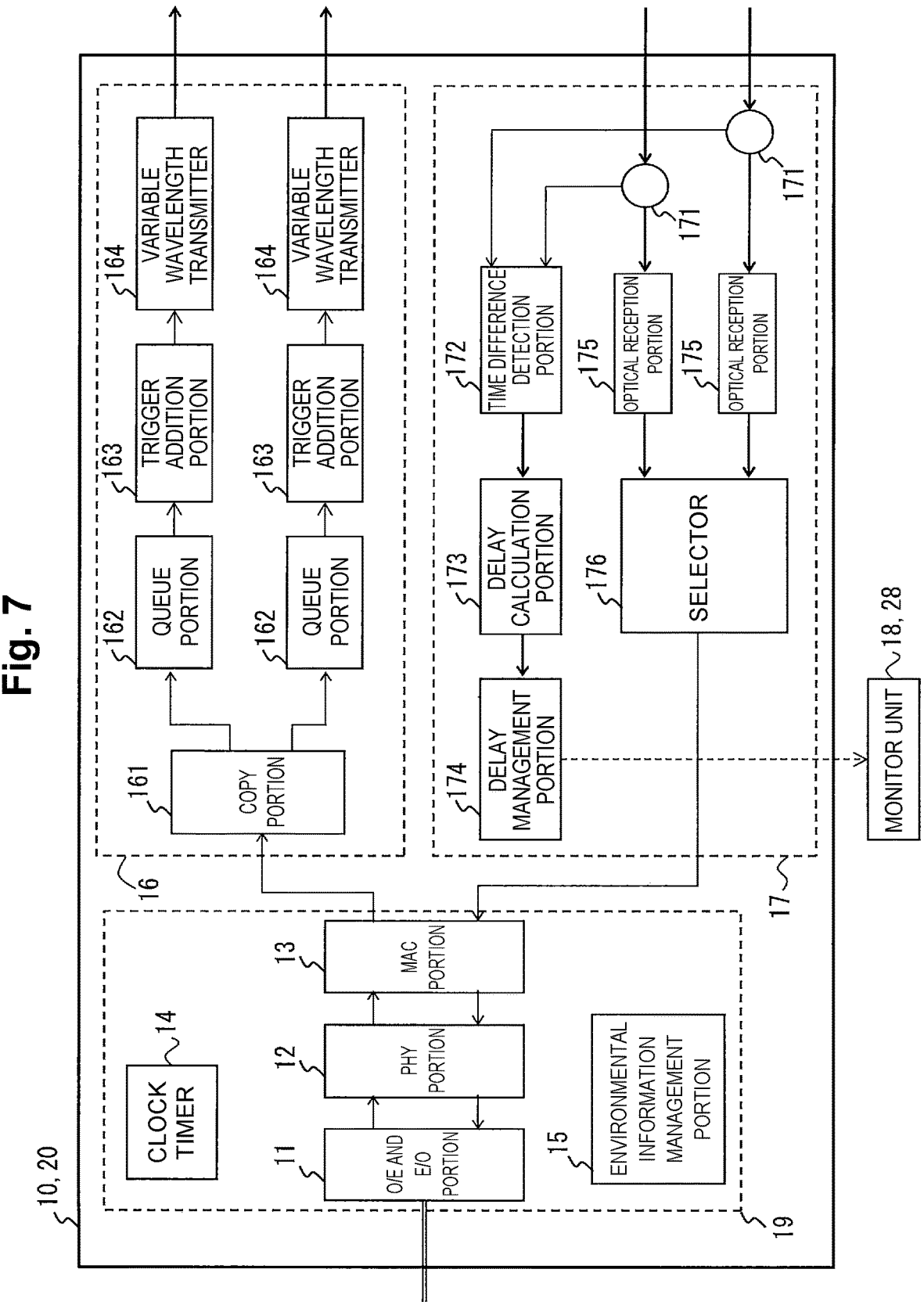
FIG. 7 is a block diagram illustrating a first synchronization module or a second synchronization module according to the embodiment of the invention.

FIG. 7 is a block diagram illustrating the first synchronization module 10 or the second synchronization module 20. The configurations of both modules are the same because propagation delays are measured on both sides in the same way as shown in FIG. 5.

A control section, which is one of the components of each module, may be a computer including a Central Processing Unit CPU, a memory, storage means (a storage portion) such as a hard disk, a non-volatile memory and a solid-state drive (SSD), and a network interface.

The computer of the control section operates the processing unit by the CPU executing programs (also referred to as applications or apps, an abbreviation for applications) loaded into the memory.

An O/E and E/O portion 11, variable wavelength transmitters 164, couplers 171 and optical reception portions 175 are respectively implemented in separate pieces of hardware. A PHY portion 12 and a MAC portion 13 are respectively implemented as Large Scale Integrations (LSIs).

Each of the first synchronization module 10 and the second synchronization module 20 includes a transmission section 16 that transmits PTP packets, a reception section 17 that receives PTP packets and a shared section 19. The shared section 19 includes the Optical-to-Electronic and Electronic-to-Optical signal converter (O/E and E/O) portion 11, the physical layer (PHY) portion 12, the Medium Access Control (MAC) portion 13, a clock timer 14 and an environmental information management portion 15.

The clock timer 14 provides a frequency or timing to ensure synchronized operations between any functional portions in the first synchronization module 10.

The environmental information management portion 15 manages information on wavelength dispersion coefficients and temperature.

The transmission section 16 includes queue portions 162, trigger addition portions 163 and the variable wavelength transmitter 164 respectively for two wavelengths, and also includes copy portion 161 that make copies of a packet and input the copies to both of those two transmission chains.

The copy portion 161 makes copies of a PTP packet for the two wavelengths.

The queue portions 162 store PTP packets that are to be transmitted.

The trigger addition portion 163 add a trigger for arrival time difference detection performed by a time difference detection portion 172 to a PTP packet that is to be transmitted. The trigger may be implemented as a particular signal pattern (e.g., "101010 . . . 11") such as an Ethernet® preamble for recognizing the timing of a measurement target. The trigger may also be implemented as a particular value of a particular field in a packet.

One of the variable wavelength transmitters 164 converts a PTP packet or a proprietary packet into an optical signal having one of the two wavelengths and the other of the variable wavelength transmitters 164 converts the PTP packet or the proprietary packet into an optical signal having the other of the two wavelengths. Both of the variable wavelength transmitters 164 for the two wavelengths transmit the resultant optical signals simultaneously. While a case of using two wavelengths is taken as an example, three or more variable wavelength transmitters 164 may be used to transmit optical signals having three or more wavelengths simultaneously.

The reception section 17 includes the coupler 171, the time difference detection portion 172, a delay calculation portion 173, a delay management portion 174, optical reception portions 175 and a selector 176.

The couplers 171 receive optical signals having two or more wavelengths transmitted by the variable wavelength transmitters 164 and output the received optical signals to the time difference detection portion 172 and the optical reception portions 175.

Figure 9:
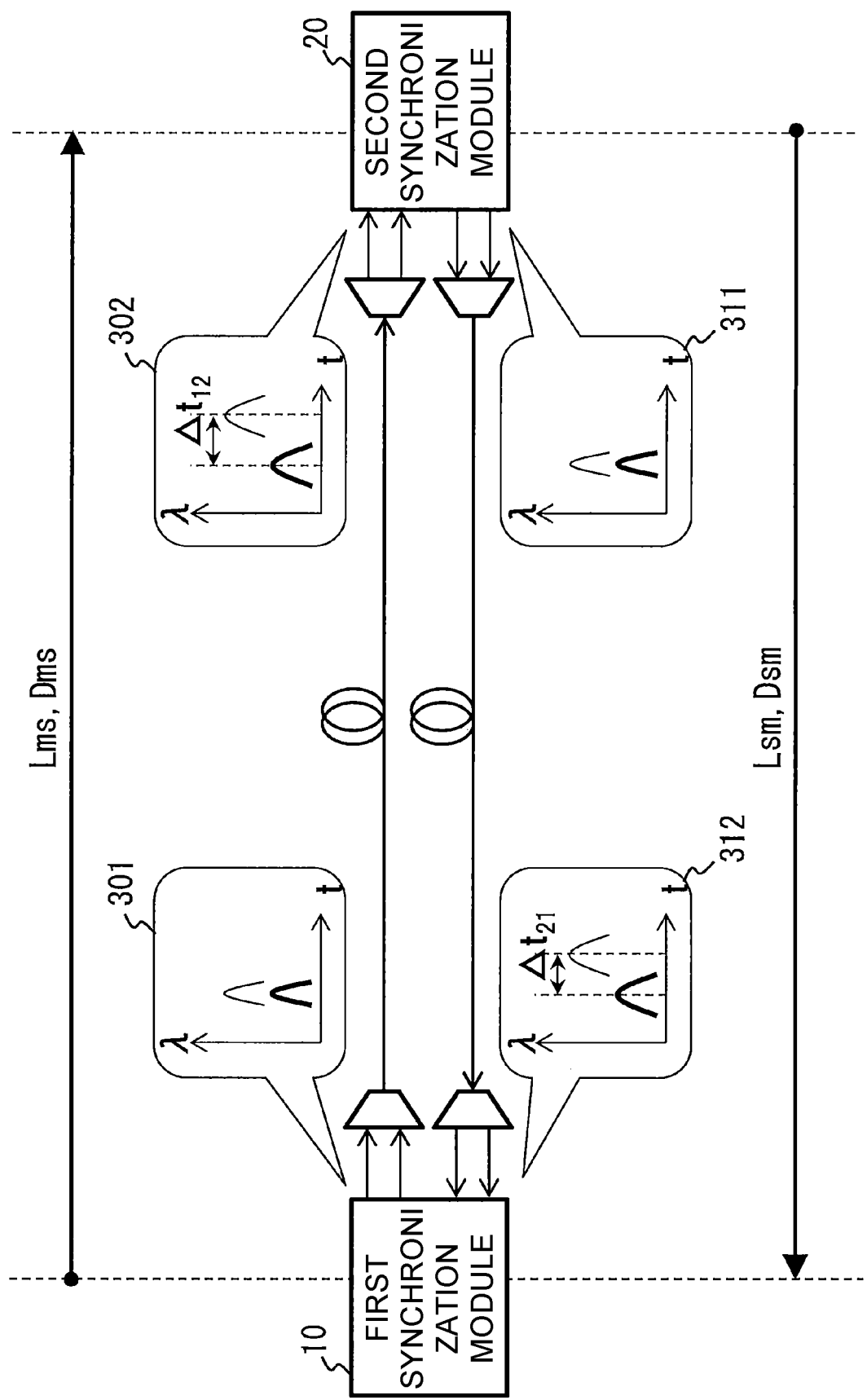
FIG. 9 is a schematic diagram illustrating a process of measuring propagation delays between the synchronization modules according to the embodiment of the invention.

The time difference detection portion 172 detects the arrival time difference Δt between the optical signals having two or more wavelengths transmitted between the first synchronization module 10 and the second synchronization module 20 (see FIG. 9 for details). The time difference detection portion 172 may be implemented using functions of an oscilloscope.

The delay calculation portion 173 calculates a propagation delay Dms or Dsm from the arrival time difference Δt (see FIG. 9 for details).

The delay management portion 174 maintains the propagation delay Dms or Dsm calculated by the delay calculation portion 173 and monitors change in the propagation delay Dms or Dsm over time. The delay management portion 174 provides the maintained propagation delay Dms or Dsm to the monitor and control device 5 via the monitor unit 18 or 28.

The optical reception portions 175 convert optical signals provided from the couplers 171 to electrical signals. When optical signals are converted, processing such as dispersion compensation may be performed.

The selector 176 selects and outputs one of the packets (electrical signals) for two wavelengths (e.g., the one that arrived earlier) to the shared section 19.

Figure 8:
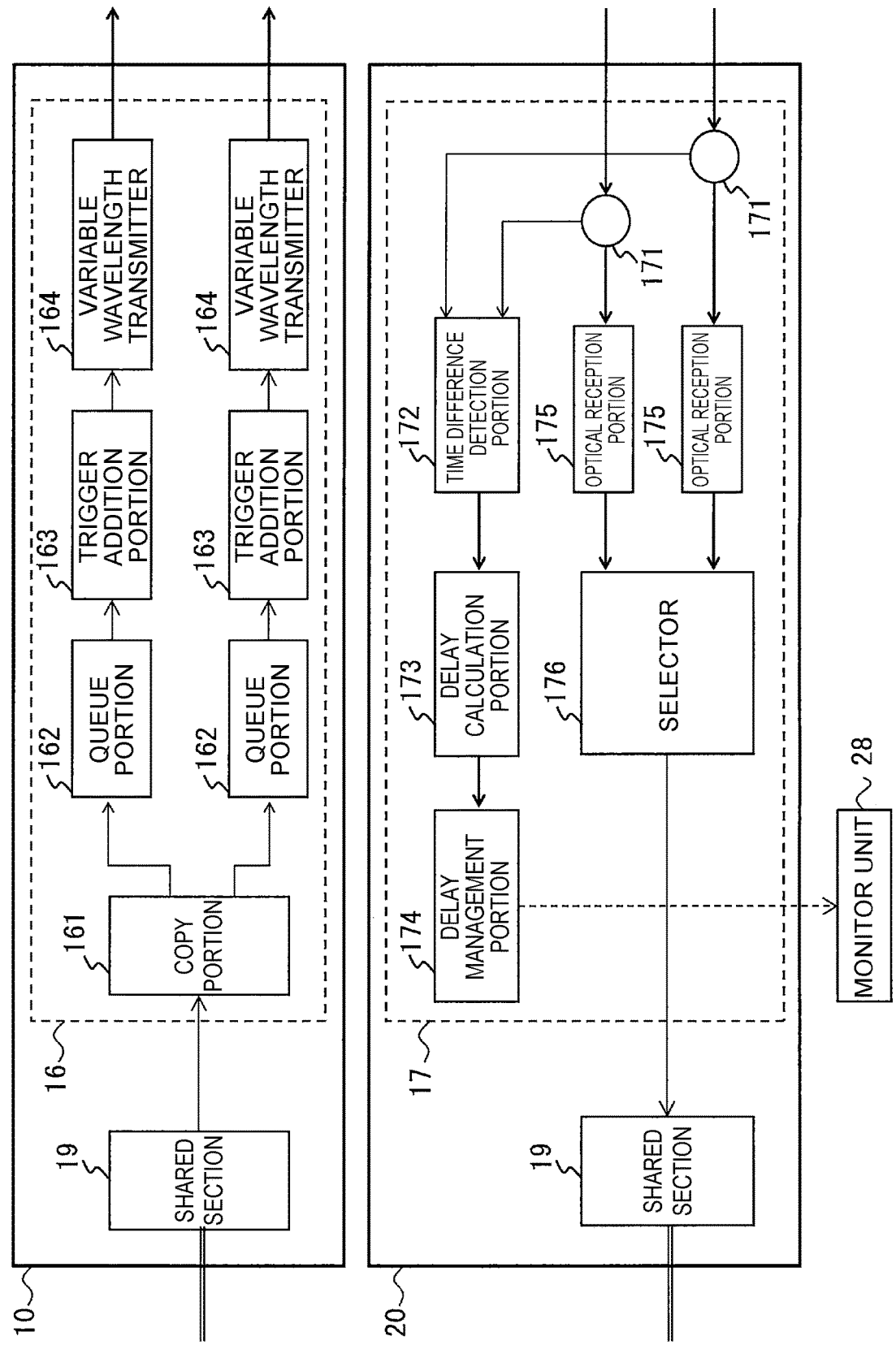
FIG. 8 is a block diagram illustrating the first synchronization module and the second synchronization module having different configurations according to the embodiment of the invention.

FIG. 8 is a block diagram illustrating the first synchronization module 10 on the PTP packet transmission side and the second synchronization module 20 on the PTP packet reception side having different configurations. In conformance with the simplified configuration having only one transfer path shown in FIG. 6, the reception section 17 is omitted in the first synchronization module 10 and the transmission section 16 is omitted in the second synchronization module 20 in FIG. 7. The other components are the same as those in FIG. 7.

FIG. 9 is a schematic diagram illustrating a process of measuring propagation delays between the synchronization modules.

The length of downlink transmission line from the first synchronization module 10 to the second synchronization module 20 is Lms and the length of uplink transmission line from the second synchronization module 20 to the first synchronization module 10 is Lsm.

It is assumed that the wavelength dispersion coefficient C [ps/nm/km] of the optical fibers is known and Lms and Lsm are unknown. Although not shown in FIG. 9, pairs of optical fibers between the synchronization modules and the time synchronization devices (the master node 3 and the slave node 4) have the same length. Groups of optical fibers between the synchronization modules and the MUX 92/DEMUX 93 shown in FIG. 3 and FIG. 4 also have the same length.

The variable wavelength transmitters 164 of the first synchronization module 10 input optical signals having two wavelengths (the wavelength difference: Δλ [nm]) into a transmission line simultaneously (301). At 301, an optical signal represented by a bold line and an optical signal represented by a thin line have different wavelengths. In the transmission line that propagates the optical signals having the two wavelengths, the arrival timings of the optical signals at the second synchronization module 20 differ due to dispersion and the like.

The time difference detection portion 172 of the second synchronization module 20 detects the arrival time difference (Δt12 [ps]) between optical signals having two or more wavelengths (302).

The delay calculation portion 173 of the second synchronization module 20 calculates L12 using the following expression: Δt12=C×Δλ×L12. Then, the delay calculation portion 173 calculates a propagation delay Dms using the expression: Dms=5000 [ns/km]×L12 [km] (×temperature correction).

The above describes details of the process of calculating the propagation delay Dms based on optical signals having two wavelengths transmitted from the first synchronization module 10 to the second synchronization module 20.

In the same manner, the first synchronization module 10 detects the arrival time difference (Δt21 [ps]) (312) between optical signals having two wavelengths transmitted simultaneously by the second synchronization module 20 in the inverse direction (311), and calculates a propagation delay Dsm.

Figure 10:
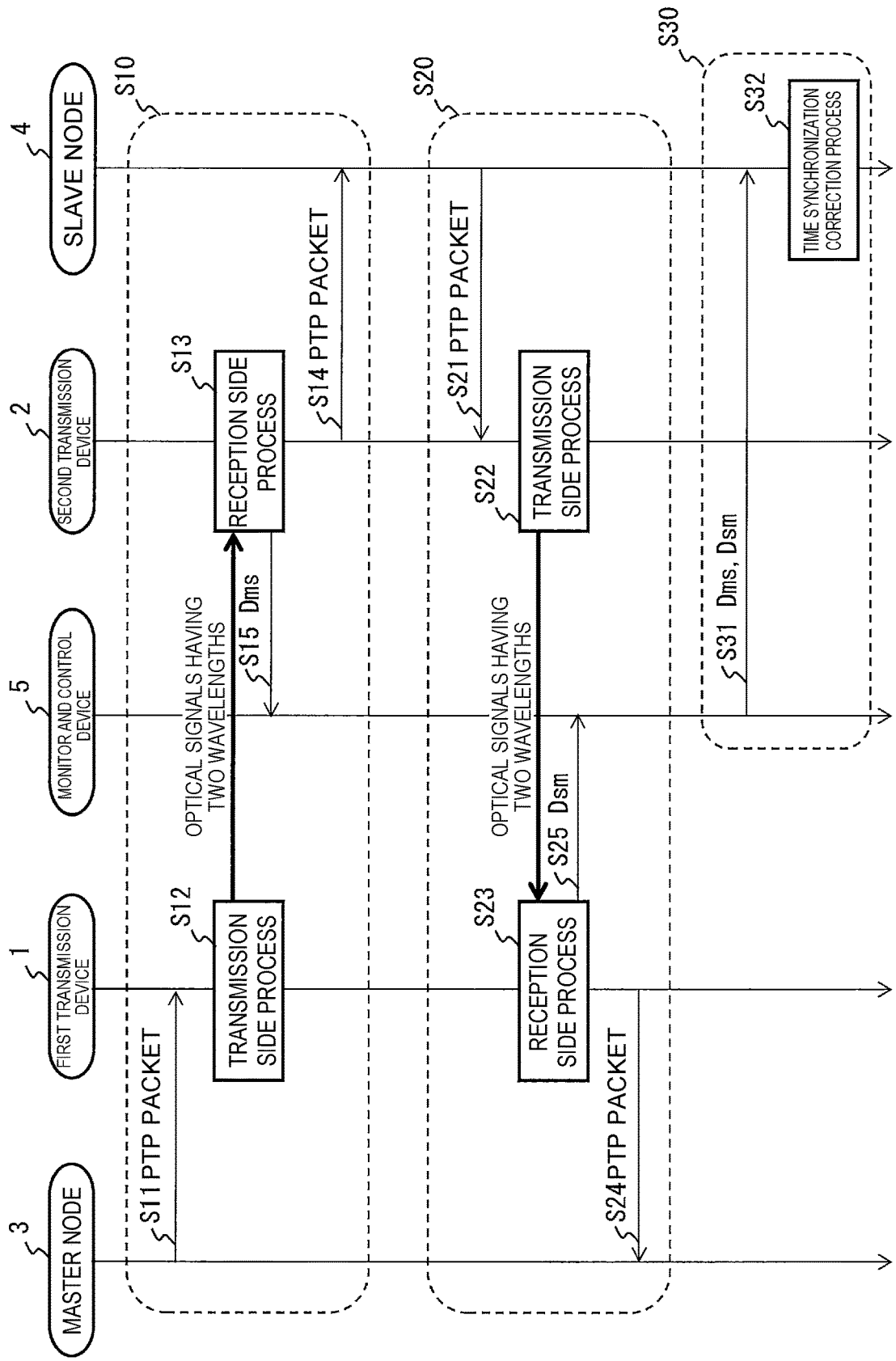
FIG. 10 is a sequence diagram illustrating an overall time synchronization process according to the embodiment of the invention.

FIG. 10 is a sequence diagram illustrating an overall time synchronization process. This sequence diagram can be divided into three process blocks.

(1) A process of transmitting a downlink PTP packet from the master node 3 to the slave node 4 and measuring by the second transmission device 2 a propagation delay Dms occurring while the PTP packet is delivered (S10, including S11 to S15).

(2) A process of transmitting an uplink PTP packet from the slave node 4 to the master node 3 and measuring by the first transmission device 1 a propagation delay Dsm occurring while the PTP packet is delivered (S20, including S21 to S25).

(3) A process of calculating an offset with high accuracy by the slave node 4 with the use of the measured propagation delays Dms and Dsm as correction parameters (S30, including S31 and S32).

First, the process (S10) of transferring a downlink PTP packet in (1) is described. The downlink PTP packet refers to a downlink Sync message (S11z in FIG. 19) or a downlink Follow-up message (S12z).

In S11, the master node 3 transmits a downlink PTP packet to the slave node 4 and the first transmission device 1 receives the PTP packet to relay the PTP packet.

In S12, the first transmission device 1 transfers the downlink PTP packet to the second transmission device 2 by performing the transmission side process that is described below with reference to FIG. 11.

In S13, the second transmission device 2 measures a propagation delay Dms occurring while the downlink PTP packet is delivered by performing the reception side process that is described below with reference to FIG. 12.

In S14, the second transmission device 2 transfers the downlink PTP packet to the slave node 4.

In S15, the second transmission device 2 provides the propagation delay Dms measured in S13 to the monitor and control device 5.

Second, the transfer process (S20) of an uplink PTP packet in (2) is described. The uplink PTP packet refers to an uplink Delay_Request message (S13z in FIG. 19).

In the transfer process (S20), a PTP packet is transmitted in the direction opposite to the direction in which a PTP packet is transmitted in the transfer process (S10), and the first transmission device 1 measures a propagation delay Dsm in S23 while the second transmission device 2 measures a propagation delay Dms in S13 in the transfer process (S10).

In S21, the slave node 4 transmits an uplink PTP packet to the master node 3 and the second transmission device 2 receives the PTP packet to relay the PTP packet.

Figure 11:
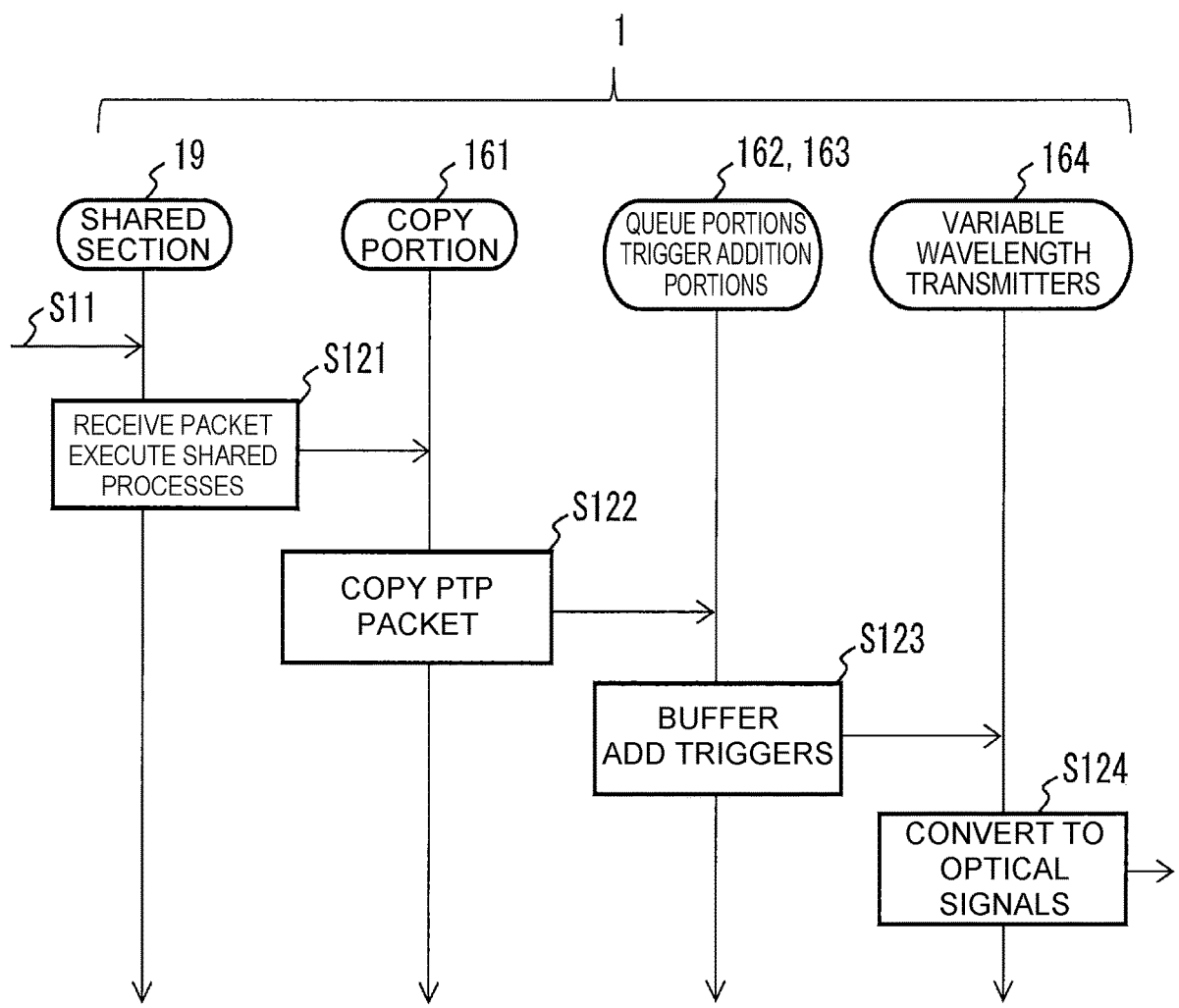
FIG. 11 is a sequence diagram illustrating details of a transmission side process S12 according to the embodiment of the invention.

In S22, the second transmission device 2 transfers the uplink PTP packet to the first transmission device 1 by performing a transmission side process similar to that shown in FIG. 11.

Figure 12:
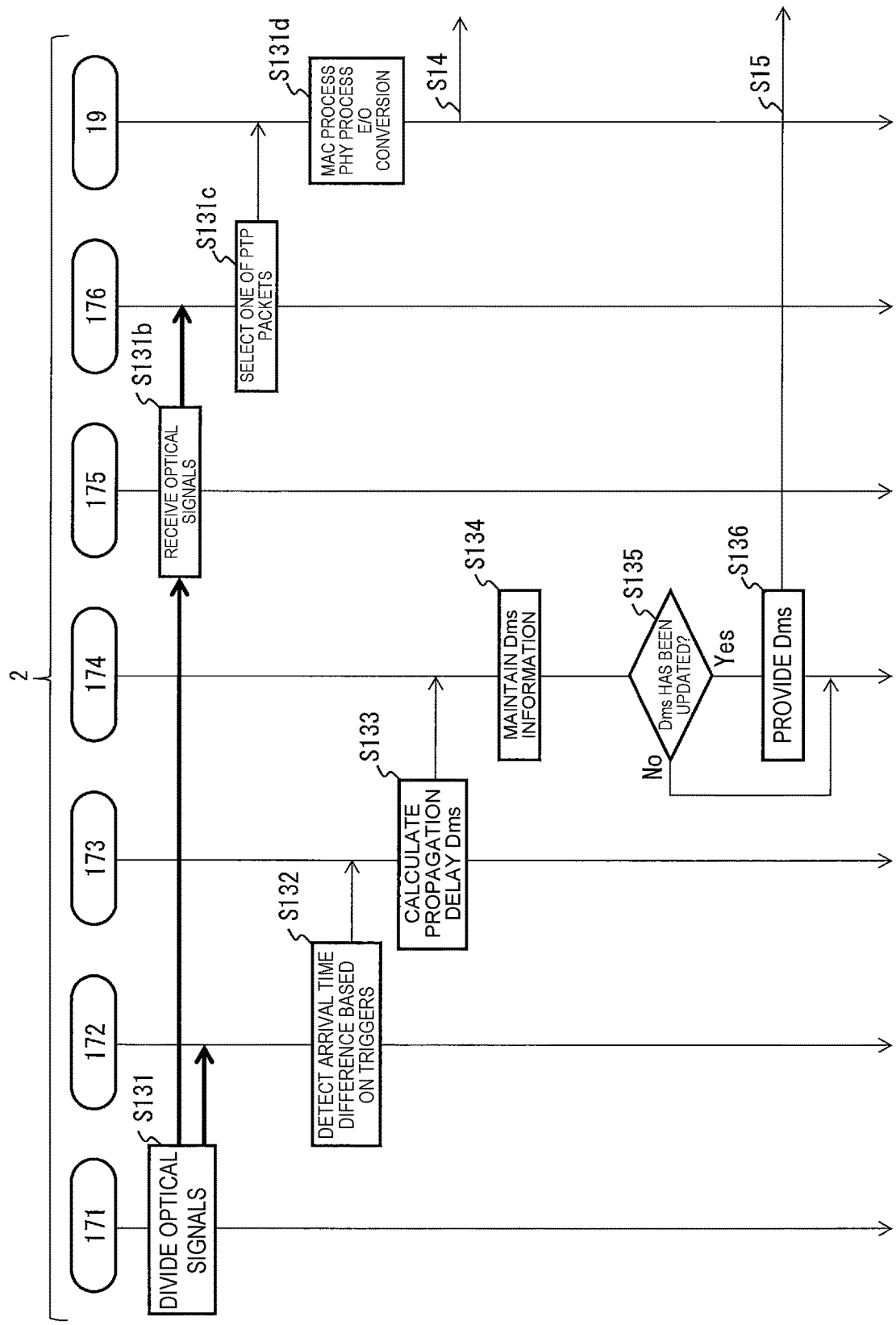
FIG. 12 is a sequence diagram illustrating details of a reception side process S13 according to the embodiment of the invention.

In S23, the first transmission device 1 measures a propagation delay Dsm occurring while the uplink PTP packet is delivered by performing a reception side process similar to that shown in FIG. 12.

In S24, the first transmission device 1 transfers the uplink PTP packet to the master node 3.

In S25, the first transmission device 1 provides the propagation delay Dsm measured in S23 to the monitor and control device 5.

Lastly, the process (S30) of calculating an offset in (3) is described.

In S31, the monitor and control device 5 transfers the propagation delays Dms and Dsm provided by the transmission devices to the slave node 4 as shown in FIG. 5.

In S32, the slave node 4 performs a time synchronization correction process on its clock. In particular, the slave node 4 calculates an offset value using the following expression 2:

The offset value=((the receive time $t2$−the transmit time $t1$)−(the receive time $t4$−the transmit time $t3$))/2+(the propagation delay $Dsm$−the propagation delay $Dms$)/2     (Expression 2).

As compared to the above expression 1, in expression 2, the second term (the term including the propagation delays) is added for correcting time synchronization.

For another example of S32, the slave node 4 can synchronize the time on the slave side with that on the master side by adjusting the receive time t2 on the slave side to be equal to the transmit time t1 on the master side plus the propagation delay Dms calculated with high accuracy. This makes it possible to use only the propagation delay Dms as shown in FIG. 6.

The overall time synchronization process is described above with reference to FIG. 10. In the following, the respective sub-processes of the overall process will be described in detail with reference to FIG. 11 and FIG. 12.

FIG. 11 is a sequence diagram illustrating details of the transmission side process in S12. This sequence is executed by the first synchronization module 10 of the first transmission device 1.

In S121, the shared section 19 executes the shared processes (namely, the processes of the O/E and E/O portion 11, the PHY portion 12 and the MAC portion 13) that are to be performed when a PTP packet is received, and outputs the result to the copy portion 161.

In S122, the copy portion 161 copies the PTP packet and outputs the copied PTP packets to the queue portions 162 for two wavelengths.

In S123, the PTP packets undergo buffering by the queue portions 162 and trigger addition by the trigger addition portions 163 and are then output to the variable wavelength transmitters 164.

In S124, the variable wavelength transmitters 164 convert the PTP packets for two wavelengths to optical signals and output the optical signals to the second synchronization module 20 simultaneously.

FIG. 12 is a sequence diagram illustrating details of the reception side process in S13. This sequence is executed by the second synchronization module 20 of the second transmission device 2.

In S131, the couplers 171 divide received optical signals for two wavelengths and output the divided optical signals to the time difference detection portion 172 and the optical reception portions 175.

In S131b, the optical reception portions 175 output the received optical signals to the selector 176.

In S131c, the selector 176 selects and outputs one of the PTP packets from the optical signals for two wavelengths to the shared section 19.

In S131d, the shared section 19 executes the processes (namely, the processes of the MAC portion 13, the PHY portion 12 and the O/E and E/O portion 11) that are to be performed when a PTP packet is transmitted, and then executes the actual PTP packet transmission process described in S14.

In S132, the time difference detection portion 172 detects the arrival time difference (Δt12) between the optical signals based on the triggers added by the trigger addition portions 163 and outputs the result to the delay calculation portion 173.

In S133, the delay calculation portion 173 calculates a propagation delay Dms from the arrival time difference between the optical signals as shown in FIG. 9 and outputs the result to the delay management portion 174.

In S134, the delay management portion 174 maintains information on the propagation delay Dms calculated in S133.

In S135, the delay management portion 174 determines whether the propagation delay Dms newly maintained in S133 has been updated from the previously maintained propagation delay Dms. If it has been updated (Yes), the process proceeds to S136; otherwise (No), the process ends.

In S136, the delay management portion 174 provides the updated propagation delay Dms to the monitor and control device 5 (S15).

The above time transmission system according to the present embodiment is characterized by measuring a delay asymmetry (propagation delays Dms and Dsm) occurring between the master node 3 and the slave node 4 with high accuracy by the transmission devices located at relay points and utilizing the delay asymmetry as correction parameters in expression 2 for calculating an offset of the slave node 4.

Accordingly, in the time transmission system, the first synchronization module 10 and the second synchronization module 20 provided in the transmission devices transmit PTP packets for two wavelengths simultaneously and calculate propagation delays Dms and Dsm between the synchronization modules with high accuracy from the arrival time difference between the PTP packets.

This can remove a cause of errors (link asymmetry) in the time synchronization protocol PTP when an offset is calculated, and enable accurate time synchronization between geographically distant sites.

Additionally, the programs that operate the control sections of the first synchronization module 10 and the second synchronization module 20 can be distributed through communication lines or recorded on and distributed via recording media such as CD-ROMs.

FIG. 13 to FIG. 17 illustrates alternative examples of transmitting a propagation delay Dms and/or a propagation delay Dsm from the transmission device(s) (the first transmission device 1 and/or the second transmission device 2) to the slave node 4. In these alternative examples, the propagation delay(s) can be provided in a shorter time by transferring the propagation delay(s) directly from the transmission device(s) to the slave node 4 rather than transferring the propagation delay(s) via the monitor and control device 5 (the transmission control device 51, integrated monitor device 52 and the synchronization control device 53).

Figure 13:
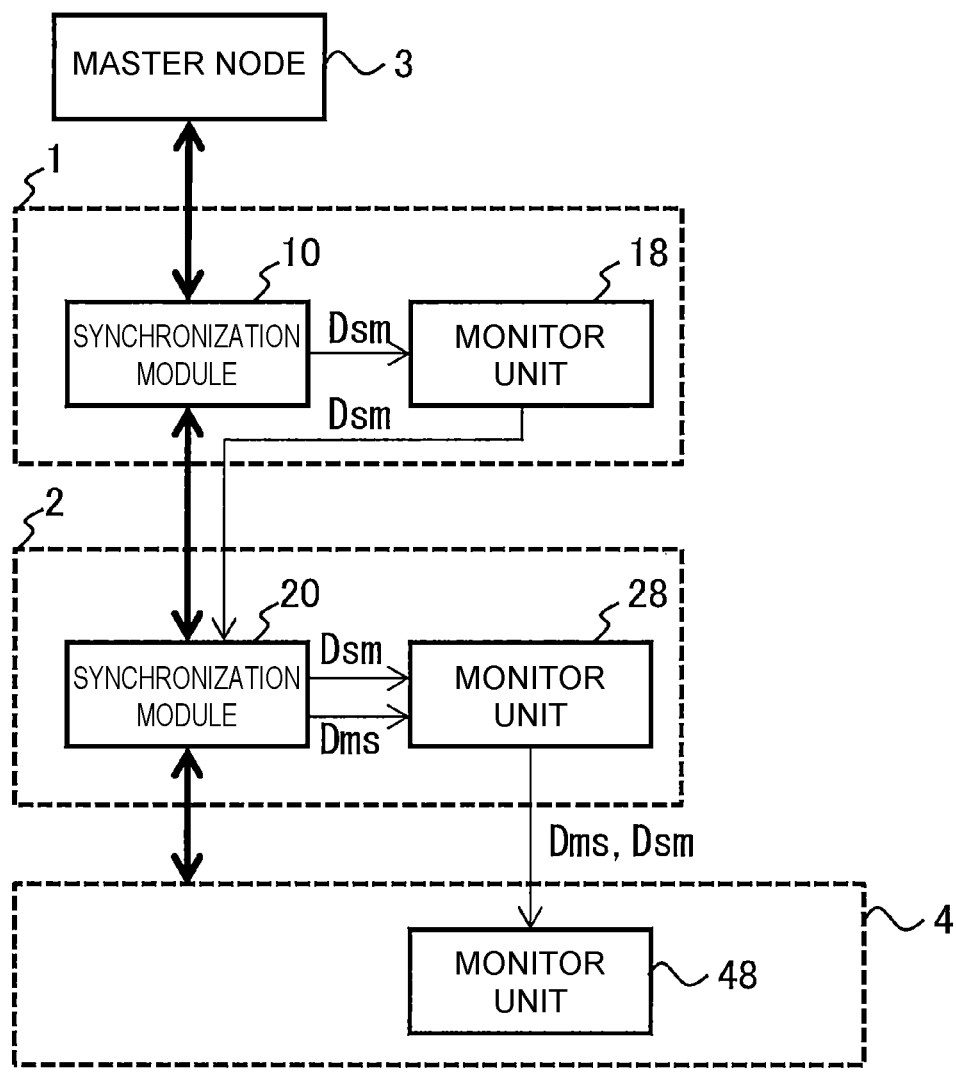
FIG. 13 is a block diagram illustrating an alternative example of transmitting propagation delays calculated on both master side and slave side to the slave node according to the embodiment of the invention.

(1) FIG. 13 illustrates propagation delays Dms and Dsm being transmitted from the monitor units 18 and 28 of the transmission devices to the monitor unit 48 of the slave node 4. In this alternative example, the monitor units 18 and 28 need to be equipped with interfaces (IFs).

Figure 14:
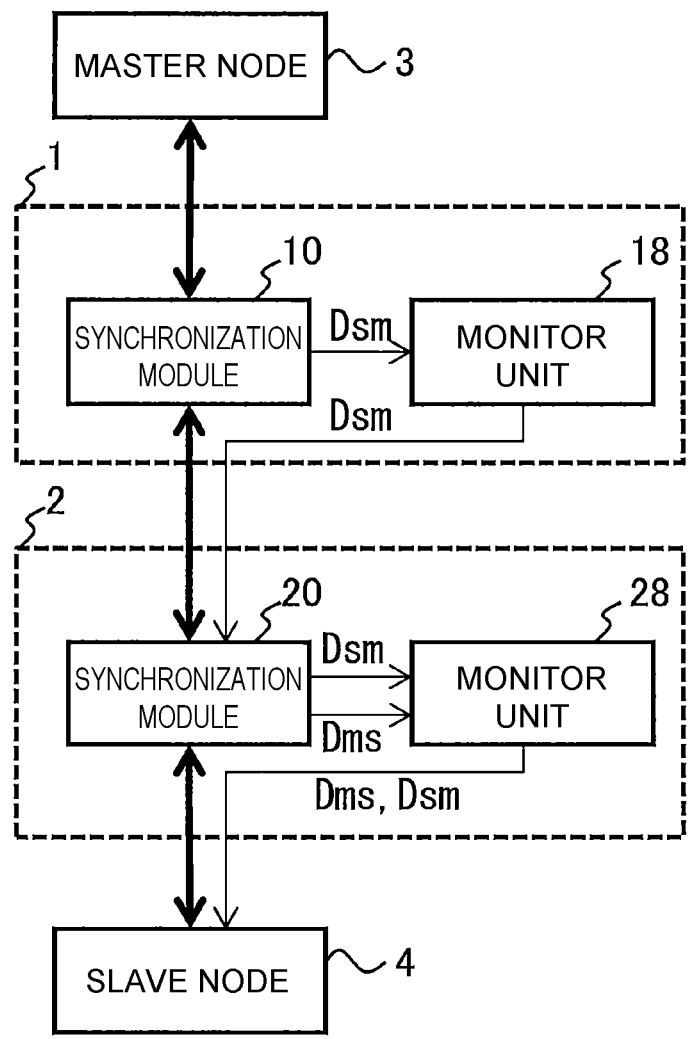
FIG. 14 is a block diagram illustrating an alternative example of transmitting propagation delays calculated on both master side and slave side to the slave node according to the embodiment of the invention.

(2) FIG. 14 illustrates propagation delays Dms and Dsm being transmitted in a PTP packet from the second transmission device 2 to the slave node 4. In this alternative example, information on the propagation delays Dms and Dsm is embedded in a field in the PTP packet and the slave node 4 has a function to read the information.

Figure 15:
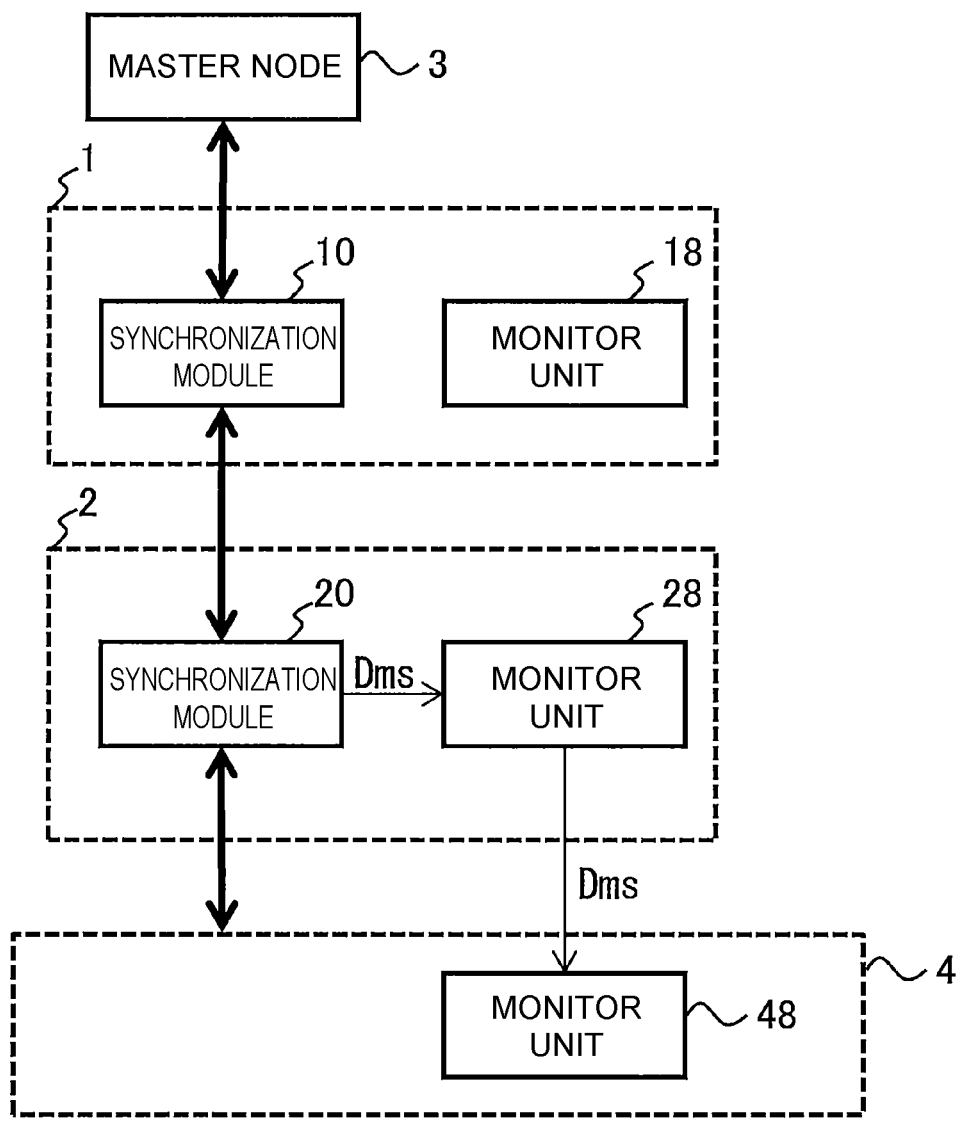
FIG. 15 is a block diagram illustrating an alternative example of transmitting a propagation delay calculated on one side to the slave node according to the embodiment of the invention.

(3) FIG. 15 illustrates a propagation delay Dms being transmitted from the monitor unit 28 of the second transmission device 2 to the monitor unit 48 of the slave node 4. In this alternative example, the monitor unit 28 need to be equipped with an IF.

Figure 16:
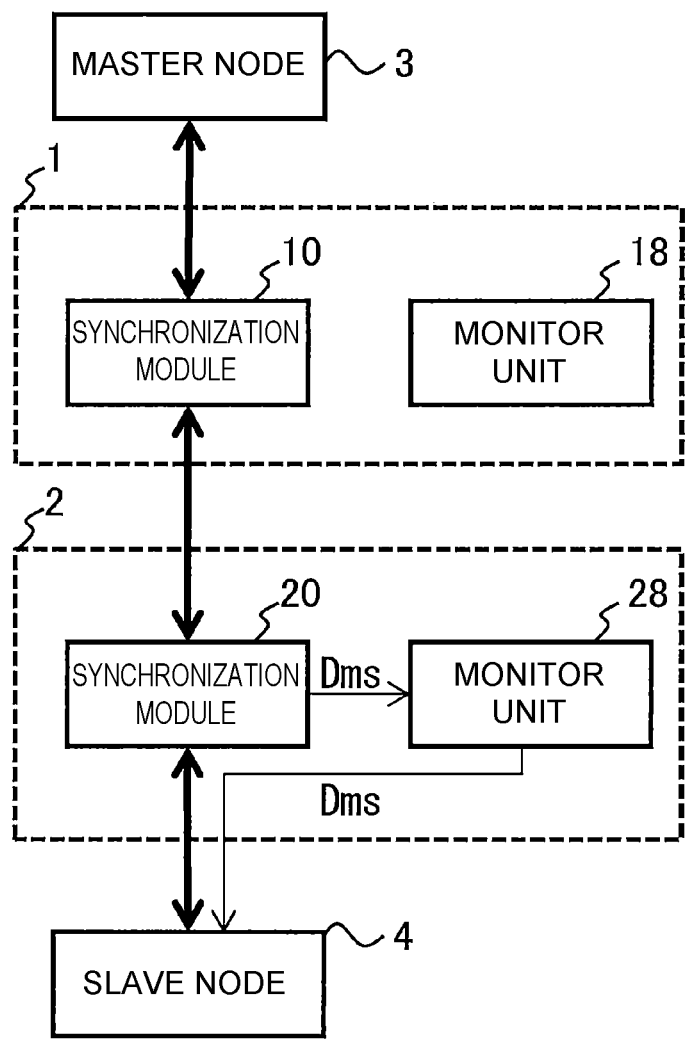
FIG. 16 is a block diagram illustrating an alternative example of transmitting a propagation delay calculated on one side to the slave node according to the embodiment of the invention.
Figure 17:
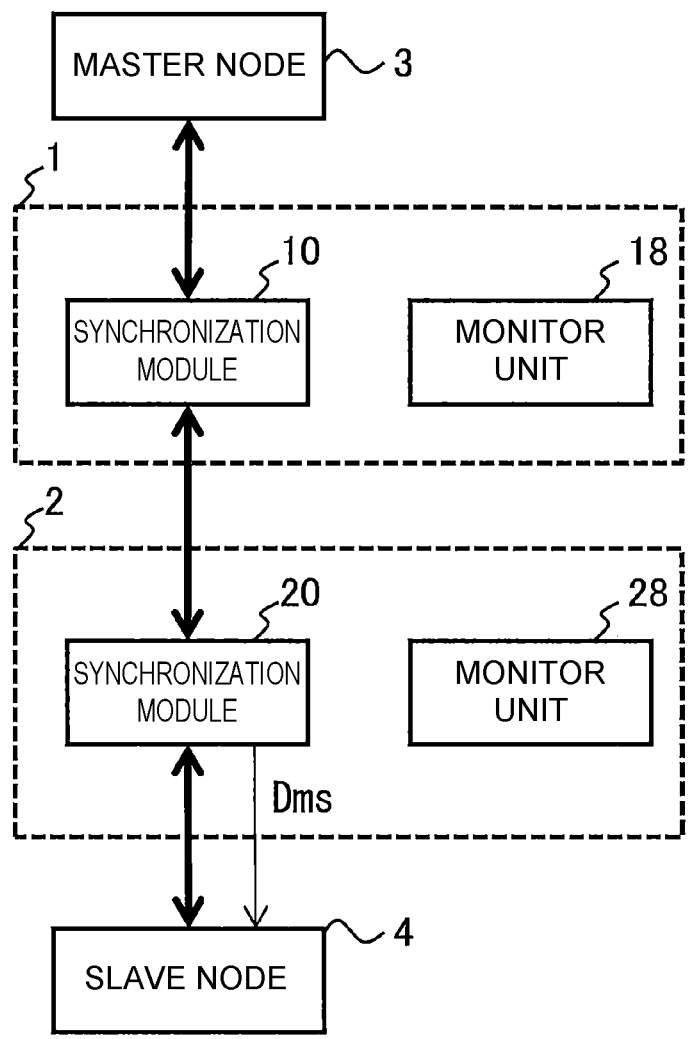
FIG. 17 is a block diagram illustrating an alternative example of transmitting a propagation delay calculated on one side to the slave node according to the embodiment of the invention.
Figure 18:
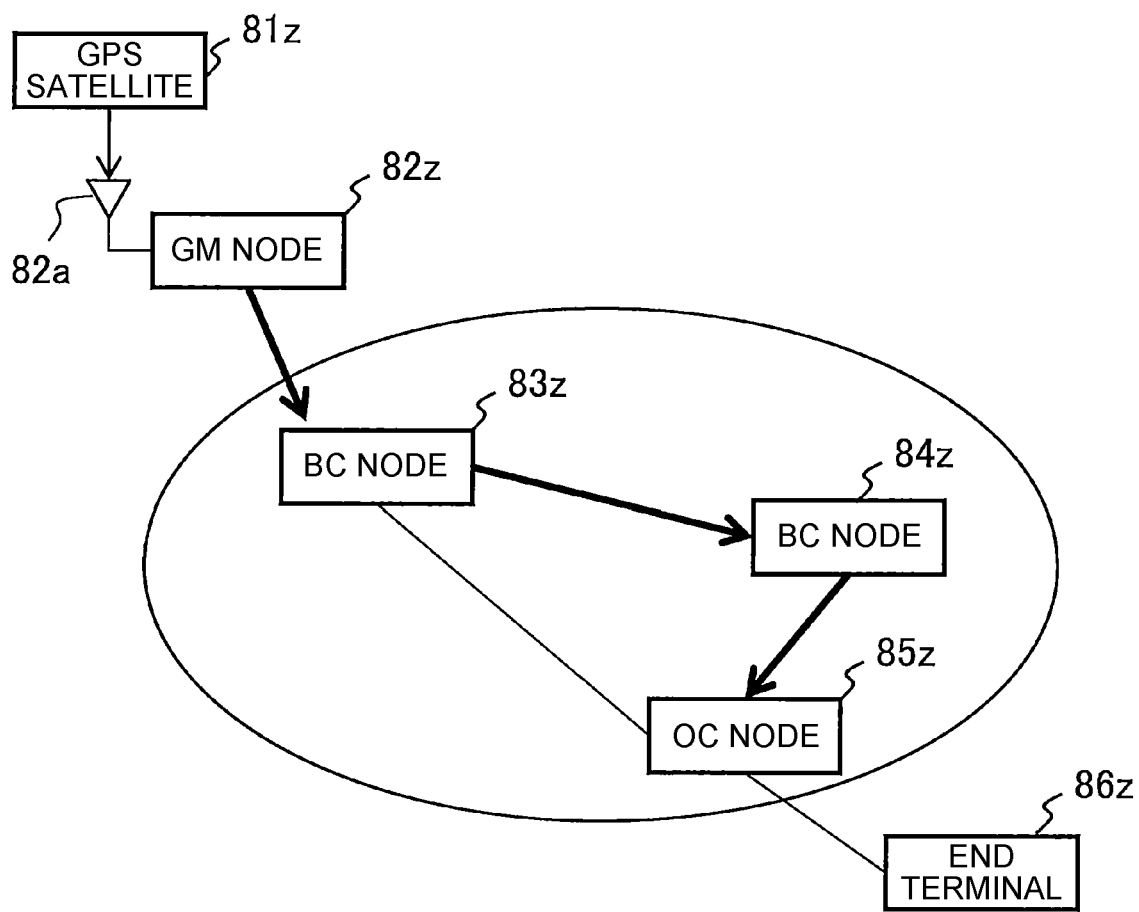
FIG. 18 is a block diagram illustrating a time transmission system to which a time synchronization technique is applied.

(4) FIG. 16 and FIG. 17 illustrate a propagation delay Dms being transmitted in a PTP packet from the second transmission device 2 to the slave node 4. In these alternative examples, information on the propagation delay Dms is embedded in a field in the PTP packet and the slave node 4 has a function to read the information.

(1) and (2) are variations of the delay calculation executed on both master side and slave side as shown in FIG. 5. (3) and (4) are variations of the delay calculation executed on one side as shown in FIG. 6.

REFERENCE SIGNS LIST

1 First transmission device
2 Second transmission device
3 Master node (first time synchronization device)
4 Slave node (second time synchronization device)
5 Monitor and control device
10 First synchronization module
11 O/E and E/O portion
12 PHY portion
13 MAC portion
14 Clock timer
15 Environmental information management portion
16 Transmission section
17 Reception section
18, 28, 48 Monitor unit
19 Shared section
20 Second synchronization module
51 Transmission control device
52 Integrated monitor device
53 Synchronization control device
161 Copy portion
162 Queue portion
163 Trigger addition portion
164 Variable wavelength transmitter
171 Coupler
172 Time difference detection portion
173 Delay calculation portion
174 Delay management portion
175 Optical reception portion
176 Selector

The invention claimed is:

1. A transmission device for use in a time transmission system, the time transmission system synchronizing time of a second time synchronization device based on time information of transmission and reception of packets for time synchronization between a first time synchronization device and the second time synchronization device via a first transmission device connected to the first time synchronization device and a second transmission device corresponding to the first transmission device and connected to the second time synchronization device, the transmission device being operable as the first transmission device or the second transmission device, comprising one or more processors configured to:

transmit packets for time synchronization for a plurality of wavelengths to the other transmission device simultaneously, wherein the first transmission device is paired with the first time synchronization device, and the second transmission device is paired with the second time synchronization device,
    wherein an uplink wiring length and a downlink wiring length between the first time synchronization device and the first transmission device are the same, and an uplink wiring length and a downlink wiring length between the second transmission device and the second time synchronization device are the same;
receive the packets for time synchronization for the plurality of wavelengths from the other transmission device, measure a propagation delay on a path from the other transmission device to the transmission device based on a difference between arrival times of the received packets for time synchronization for the plurality of wavelengths, wherein measuring the propagation delay comprises:
determining, using the difference between arrival times of the received packets, a length of a downlink transmission line and a length of an uplink transmission line between the first and second transmission devices, and
determining the propagation delay for each of the downlink transmission line and the uplink transmission line using the corresponding length, a temperature correction, and a predetermined delay for each length unit due to temperature change; and
provide the propagation delay to the second time synchronization device as a correction parameter used in a process of synchronizing time of the second time synchronization device.

2. A time transmission system comprising a transmission device, a first time synchronization device and a second time synchronization device, the time transmission system synchronizing time of the second time synchronization device based on time information of transmission and reception of packets for time synchronization between the first time synchronization device and the second time synchronization device via a first transmission device connected to the first time synchronization device and a second transmission device corresponding to the first transmission device and connected to the second time synchronization device, wherein the transmission device being operable as the first transmission device or the second transmission device, comprising one or more processors configured to:
transmit packets for time synchronization for a plurality of wavelengths to the other transmission device simultaneously, wherein the first transmission device is paired with the first time synchronization device, and the second transmission device is paired with the second time synchronization device,
wherein an uplink wiring length and a downlink wiring length between the first time synchronization device and the first transmission device are the same, and an uplink wiring length and a downlink wiring length between the second transmission device and the second time synchronization device are the same; and
receive the packets for time synchronization for the plurality of wavelengths from the other transmission device, measure a propagation delay on a path from the other transmission device to the transmission device based on a difference between arrival times of the received packets for time synchronization for the plurality of wavelengths, and provide the propagation delay to the second time synchronization device as a correction parameter used in a process of synchronizing time of the second time synchronization device, wherein measuring the propagation delay comprises:
determining, using the difference between arrival times of the received packets, a length of a downlink transmission line and a length of an uplink transmission line between the first and second transmission devices, and
determining the propagation delay for each of the downlink transmission line and the uplink transmission line using the corresponding length, a temperature correction, and a predetermined delay for each length unit due to temperature change; and
the second time synchronization device is configured to calculate an offset value that is a difference between a clock of the first time synchronization device and a clock of the second time synchronization device by using transmit times and receive times of the packets for time synchronization at the first and second time synchronization devices and correction parameters provided by the first transmission device and the second transmission device.

3. A delay correction method implemented by a time transmission system, the time transmission system synchronizing time of a second time synchronization device based on time information of transmission and reception of packets for time synchronization between a first time synchronization device and the second time synchronization device via a first transmission device connected to the first time synchronization device and a second transmission device corresponding to the first transmission device and connected to the second time synchronization device,
each of the first transmission device and the second transmission device comprising one or more processors configured to:
transmit packets for time synchronization for a plurality of wavelengths to the other transmission device simultaneously, wherein the first transmission device is paired with the first time synchronization device, and the second transmission device is paired with the second time synchronization device,
wherein an uplink wiring length and a downlink wiring length between the first time synchronization device and the first transmission device are the same, and an uplink wiring length and a downlink wiring length between the second transmission device and the second time synchronization device are the same; and
receive the packets for time synchronization for the plurality of wavelengths from the other transmission device, measure a propagation delay on a path from the other transmission device to the transmission device based on a difference between arrival times of the received packets for time synchronization for the plurality of wavelengths, and provide the propagation delay to the second time synchronization device as a correction parameter used in a process of synchronizing time of the second time synchronization device, wherein measuring the propagation delay comprises:
determining, using the difference between arrival times of the received packets, a length of a downlink transmission line and a length of an uplink transmission line between the first and second transmission devices, and
determining the propagation delay for each of the downlink transmission line and the uplink transmission line using the corresponding length, a temperature correction, and a predetermined delay for each length unit due to temperature change.

* * * * *